United States Patent [19]

Bigham

[11] Patent Number: 4,682,579
[45] Date of Patent: Jul. 28, 1987

[54] CONDENSATE OVERFLOW CONTROL FOR FURNACE

[75] Inventor: Davis L. Bigham, Franklin, Tenn.

[73] Assignee: Heil-Quaker Corporation, LaVergne, Tenn.

[21] Appl. No.: 831,981

[22] Filed: Feb. 21, 1986

[51] Int. Cl.⁴ .................. F24H 3/02; F04B 10/00
[52] U.S. Cl. .................. 126/110 R; 126/99 R; 126/116 A; 237/55; 137/132; 137/192; 4/205
[58] Field of Search .......... 126/110 R, 116 R, 99 R, 126/116 A; 431/19, 1; 137/129, 130, 132, 135, 192, 171; 237/55; 4/205

[56] References Cited

U.S. PATENT DOCUMENTS

| | | | |
|---|---|---|---|
| 2,367,038 | 1/1945 | Martin | 431/64 |
| 2,913,044 | 11/1959 | Mobley | 431/19 X |
| 3,230,966 | 1/1966 | Richards | 137/192 X |
| 4,295,519 | 10/1981 | Bellatt | 237/55 X |
| 4,479,482 | 10/1984 | Cherington | 137/132 X |
| 4,542,734 | 9/1985 | Trent et al. | 126/116 R X |

Primary Examiner—Larry Jones
Attorney, Agent, or Firm—Jeffers, Hoffman & Niewyk

[57] ABSTRACT

A safety device for monitoring the condition of the condensate outlet conduit in a high efficiency furnace is provided which comprises a float member positioned in a condensate trap arranged to float on the condensate and to rise in response to a rising level of condensate in the trap to block the gas vent inlet. A pressure sensing device is utilized to sense the back pressure in the vent and when the float blocks the vent inlet, the back pressure increased and the sensing device will then operate to terminate operation of the furnace.

17 Claims, 4 Drawing Figures

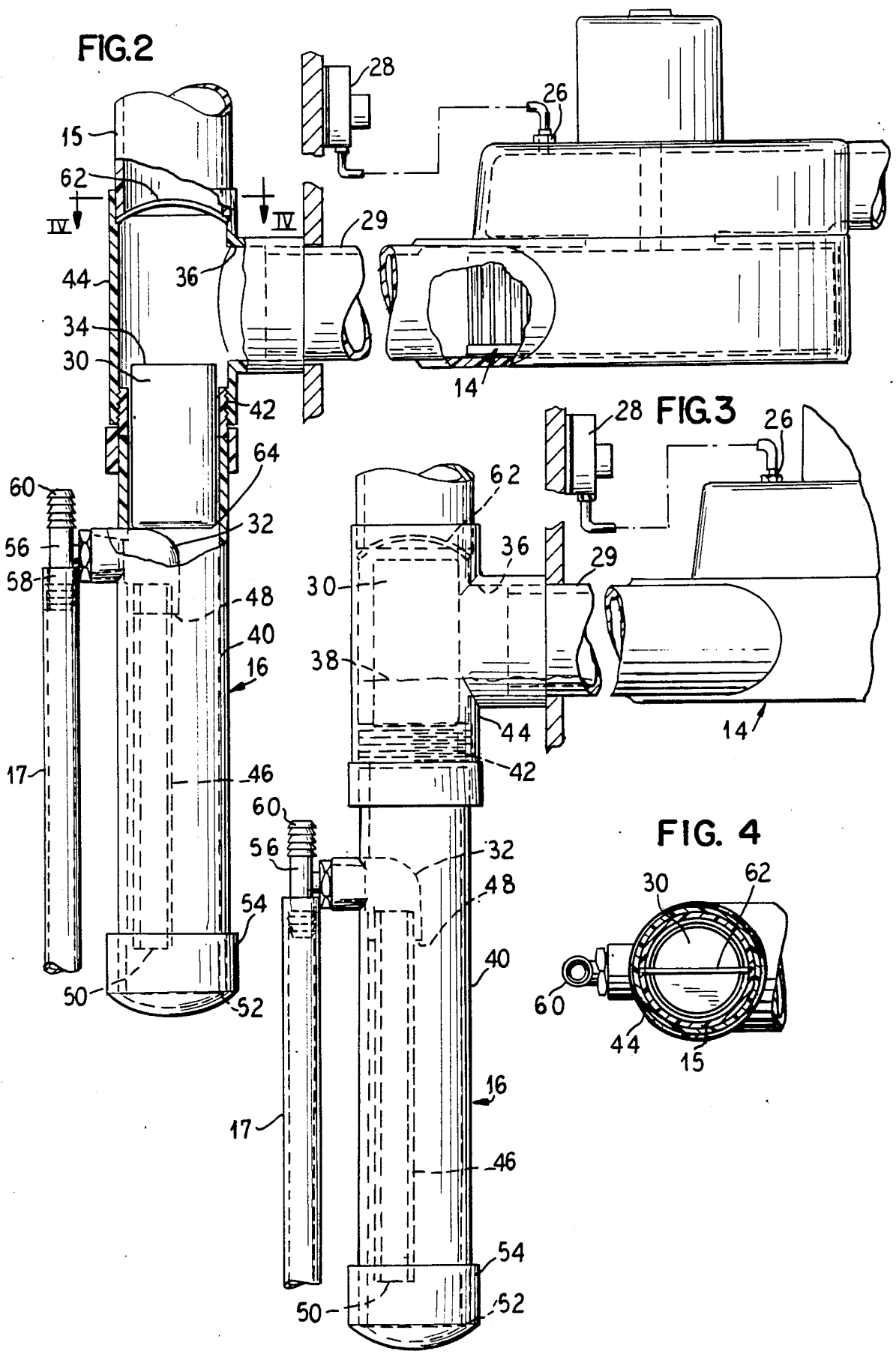

CONDENSATE OVERFLOW CONTROL FOR FURNACE

BACKGROUND OF THE INVENTION

1. Field of the Invention

This invention relates to a device for detecting a blocked condensate line in a high efficiency furnace.

2. Description of the Prior Art

Condensate traps are used widely in the prior art to collect water or other liquids which condense out of an air stream. For example, U.S. Pat Nos. 4,479,482 and 2,085,584 disclose condensate traps. The trap of U.S. Pat. No. 4,479,482 uses a siphon arrangement for drainage and the trap of U.S. Pat. No. 2,085,584 uses a float controlled valve for emptying the trap.

Automatic flue or damper controls are also known in the art. U.S. Pat. No. 2,913,044 discloses a furnace control system which sounds an alarm and shuts off the fuel supply if back pressure in the chimney is too high. U.S. Pat. No. 2,367,038 discloses a damper draft that controls the fuel supply. U.S. Pat. No. 2,275,833 discloses an automatic damper controlled by the presence of smoke in the flue and U.S. Pat No. 2,178,171 discloses a float controlled damper.

The condensate trap disclosed in U.S. Pat No. 4,479,482 as well as the trap disclosed in U.S. Pat. No. 4,542,734 merely utilize an overflow arrangement to remove collected condensate from the trap. No provision is made for detecting a blocked condensate drain or an increase in the level of the condensate in the trap to an undesirably high level.

SUMMARY OF THE INVENTION

The present invention is useful in a high efficiency furnace, particularly one similar to that disclosed in U.S. Pat. No. 4,542,734, in which the hot exhaust gases are passed through a primary and secondary heat exchanger to remove as much heat from the products of combustion as is possible. The use of the secondary heat exchanger reduces the temperature of the combustion products leaving the furnace to less than 200° F. which results in condensation of some of those combustion products. A blower is utilized to regulate the flow of the combustion products and to direct them up a vent pipe. A separator is used to separate the liquid components which have condensed from the gaseous components. The liquid components which are usually caustic are discharged by a conduit through a condensate trap to a drain. If the conduit to the drain becomes clogged or stopped for any reason, the liquids will back up and flow into the blower housing and associated piping, resulting in some damage to the blower, the housing or the piping.

A pressure switch is utilized on this type of furnace to sense that the negative pressure created by the combustion blower is sufficient to assure the presence of adequate air for safe combustion before turning the ignition control and gas valve on. The pressure switch is also used to detect any decrease in the negative pressure caused by a flue blockage which might be sufficient to reduce the combustion air below a safe level, in which case it would then cause the furnace to be turned off.

The present invention provides a third function for the pressure switch, which is to detect a blocked condensate line and to shut the furnace off before an unsafe condition of a rising condensate level occurs. To provide this function, a float is provided in the condensate trap which communicates with the blower outlet. Under normal operation, this float is positioned in the trap below the combustion blower exit, thus the furnace operates normally. In the case of a drain line blockage, the condensate rises in the trap and raises the float to a position which obstructs the combustion blower outlet, causing an increase in the blower exit pressure, a decrease in the inlet negative pressure, causing the pressure switch to open, thus turning the furnace off. In this manner, the furnace is turned off before the condensate level is high enough to allow the condensate to flow back into the blower area.

BRIEF DESCRIPTION OF THE DRAWINGS

FIG. 2 is a sectional view of the condensate trap showing the float in the normal position.

FIG. 3 is a side sectional view of the condensate trap showing the float in an elevated and blocking position.

FIG. 4 is a top sectional view taken generally along line IV—IV of FIG. 2.

DESCRIPTION OF THE PREFERRED EMBODIMENTS

Figure 1:
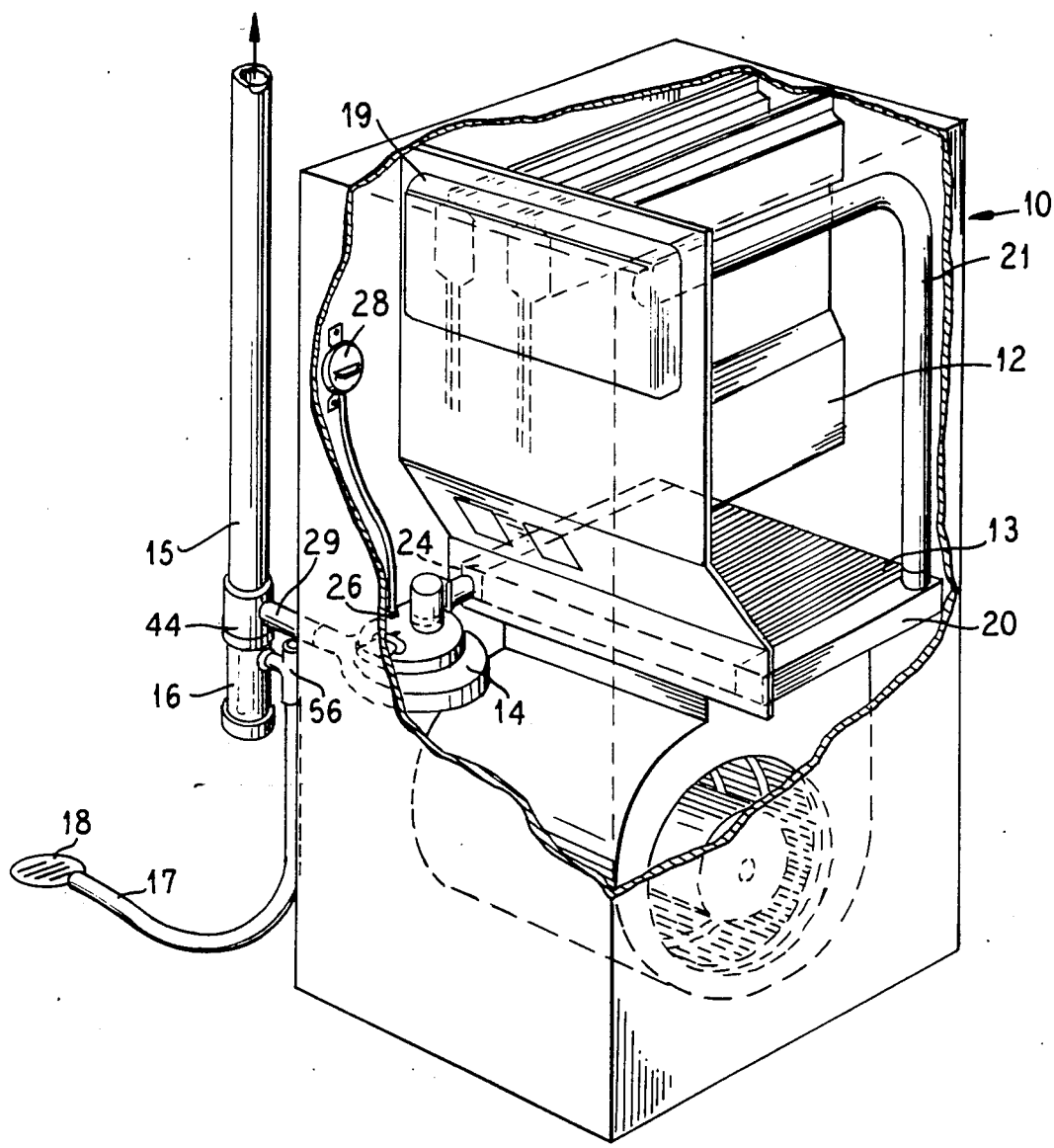
FIG. 1 is a perspective view of a high efficiency furnace partially cut away illustrating the present invention.

In the exemplary embodiment of the invention as disclosed in the drawings, a domestic forced-air furnace generally designated at 10 includes a conventional burner (not shown) fitted into a primary heat exchanger 12 and adapted to burn hydrocarbon fuel, such as natural gas. The products of combustion resulting from the burning of the natural gas fuel are passed in heat transfer relationship with the air to be conditioned by flow first through the primary heat exchanger 12 and subsequently through a secondary heat exchanger 13. The products of combustion are drawn from the secondary heat exchanger by an air moving means generally designated 14 which, in the illustrated embodiment, comprises a blower which rotates about a vertical axis. The products of combustion are discharged from the blower to a flue gas vent pipe 15 for discharge from the household by means of a suitable vent or stack (not shown).

Condensate developed from the products of combustion, primarily in the secondary heat exchanger 13, is passed therefrom through the blower 14 to a separator trap 16 which separates the liquid components of the fluid flow from the gaseous components thereof. The liquid components which are usually caustic are delivered through a suitable flow conduit 17 to a discharge position, such as a floor drain 18. The gaseous components are delivered from the separator trap 16 to the vent pipe 15 substantially free of the liquid components.

As shown in FIG. 1, the heat exchanger 12 comprises a conventional clam-shaped heat exchanger provided with a flue collector box 19. Secondary heat exchanger 13 includes an inlet header box 20 which receives the products of combustion from the collector box 19 through a transfer pipe 21.

The products of combustion flow through the heat exchanger 13 from the inlet header 20 to an outlet header 24 as is more specifically defined in U.S. Pat No. 4,542,734, assigned to the assignee of the present invention, which patent is included herein by reference.

The heat exchanger 13 is inclined slightly to the horizontal downwardly toward the outlet header 24 and toward the blower 14 so as to cause condensate which may form in the secondary heat exchanger to flow toward the blower 14.

A pressure sensor 26 is connected to a pressure switch 28 which is used to sense the negative pressure created by the combustion blower to assure the presence of adequate air for safe combustion before the ignition control and gas valve are turned on. The sensor also detects the decrease in negative pressure caused by a flue blockage that would be sufficient to reduce the combustion air below a safe level and turn off the furnace whenever that situation occurs.

If the outlet for the condensate becomes blocked in any manner, the level of condensate will rise within the trap 16 and will flow back into an outlet pipe 29 toward the blower. Since the condensate is caustic, this may cause problems to the furnace equipment and piping and may even be drawn into the blower causing damage thereto. Thus, the present invention provides for the pressure sensor 26 to perform a third function, and that is to detect blockage of the condensate outlet.

To provide such a function, a float 30 (FIGS. 2 and 3) is positioned in the trap 16 where, in a normal operating position, it rests on an elbow 32 which passes through a wall of the trap 16 and which is used to pass collected fluid out of the trap. A top end 34 of the float 30 is positioned below the level of an outlet opening 36 from the outlet pipe so that the gaseous products of combustion pass unhindered up through the vent pipe 15. If, however, the level of condensate begins to increase, due, for example, to a blocked condensate outlet conduit, then the float 30 will also rise in the trap 16 such as illustrated in FIG. 3 where the condensate has reached a level indicated at 38 causing the float 30 to rise to block off the entire opening 36 between the blower 14 and the outlet vent 15. When this occurs, the pressure sensor 26 will detect an increase in the blower exit pressure (or a corresponding decrease in the inlet negative pressure) which will cause the pressure switch 28 to open and turn off the furnace. Once the condensate has been removed by removing the blockage for draining the trap 16, the float 30 will resume its normal operating position which will provide a clear passage from the blower 14 to the vent stack 15.

As is best seen in FIGS. 2 and 3, the condensate trap comprises a cylindrical pipe 40 having a threaded attachment at 42 to a connecting T 44 attached to the blower outlet pipe 29 and the vent pipe 15. The elbow 32 has a tube 46 connected to a downwardly opened end 48 and the tube extends downwardly and has its own open end 50 positioned just above a bottom end 52 of the trap cylinder pipe 40. The end 52 of the trap is sealed with a cap 54. In this manner, a level of condensate is maintained in the trap 16 of a depth equal to the distance between the cap 54 and the elbow 32 to prevent the passage of gases through the trap.

The elbow 32 projects through the cylindrical pipe 40 and has a T-fitting 56 attached to it with the drain conduit 17 being attached to a downwardly directed leg 58 of the T-fitting 56 and having an upwardly directed leg 60 open to atmosphere to allow for proper drainage of the conduit 17 and to provide a safety overflow for the conduit 17 in case of blockage. However, if blockage occurs in the tube 46 or the elbow 32, then the level of condensate will begin to rise in the trap 16 causing the float to rise and eventually causing the furnace to stop through operation of the pressure switch 28.

The pipe 40 is threadingly attached to the T-connector 44 to permit assembly of the float 34 into the pipe 40 and also to permit cleaning of the pipe. A retaining wire 62 (FIG. 4) is positioned above the float 30 in the outlet vent 15 to prevent continued upward excursion of the float due to movement of the gases pressurized by the fan 14. The wire 62 is thin enough so that it does not provide any significant back pressure. The float 30 has a bottom edge 64 having a slight radius to permit the float to drop back down into the cylindrical pipe 40 if it moves above the level of the threaded connection 42.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. In a domestic forced air condensing furnace including a blower for forcing all of the combustion products and condensate to an outlet conduit, said outlet conduit connected to a condensate trap and a vent, and a pressure sensor to detect the negative pressure created by the blower and a decrease in the negative pressure caused by a vent blockage, the improvement comprising:
   a float means positioned in said condensate trap arranged to block said outlet conduit when the condensate in said trap increases to an undesirable level and to remain clear of said outlet conduit when said condensate level is below said undesirable level; whereby, said pressure sensor will detect a rise in the condensate level when it reaches said undesirable level due to blockage of said outlet conduit by said float means.

2. A furnace according to claim 1, wherein said condensate trap comprises a cylindrical pipe and said vent comprises a cylindrical pipe, said pipes connected to said outlet conduit through a T-connection, said float comprising a cylindrical member sized to slidably move within said cylindrical pipes in response to the level of condensate within said trap and to block said outlet conduit when said condensate reaches an undesirable level.

3. A furnace according to claim 2 including a restraining means positioned in said vent cylindrical pipe above said outlet conduit connection to prevent said float from continuing to move upwardly in said vent.

4. A furnace according to claim 3, wherein said restraining means comprises a wire member extending across the diameter of said vent.

5. A furnace according to claim 2, wherein said condensate cylindrical pipe is selectively removable from said outlet conduit.

6. A furnace according to claim 5, wherein said condensate cylindrical pipe has a threaded connection at said T connection.

7. In a domestic forced air furnace having a burner including a heat exchanger for receiving the products of combustion from said burner which extracts sufficient heat from the combustion products to cause the formation of condensate, a blower, and conduit means for connecting the heat exchanger to the blower to pass all of the combustion products and condensate from the heat exchanger to the blower and the blower passing all the combustion products and condensate therethrough to an outlet conduit and then to a vent and condensate trap, respectively, said condensate trap having drainage means associated therewith, and a pressure sensor to detect the negative pressure created by the blower and a decrease in the negative pressure caused by a vent blockage, the improvement comprising:

a float means positioned in said condensate trap arranged to move between a normal operating position clear of said outlet conduit and a raised position in response to an undesirable rise in the level of condensate in said condensate trap, said raised position of said float means blocking said outlet conduit;

whereby the outlet to said vent will be blocked and said pressure sensor will sense the blockage caused by the rise in the condensate level.

8. A furnace according to claim 7, wherein said condensate trap comprises a cylindrical pipe and said vent comprises a cylindrical pipe, said pipes connected to said outlet conduit through a T-connection, said float comprising a cylindrical member sized to slidably move within said cylindrical pipes in response to the level of condensate within said trap and to block said outlet conduit when said condensate reaches an undesirable level.

9. A furnace according to claim 8 including a restraining means positioned in said vent cylindrical pipe above said outlet conduit connection to prevent said float from continuing to move upwardly in said vent.

10. A furnace according to claim 9, wherein said restraining means comprises a wire member extending across the diameter of said vent.

11. A furnace according to claim 8, wherein said condensate cylindrical pipe is selectively removable from said outlet conduit.

12. A furnace according to claim 11, wherein said condensate cylindrical pipe is selectively removable from said outlet conduit.

13. A condensate and exhaust gas outlet arrangement for a high efficiency furnace having a blower urging condensate and exhaust gases through an outlet pipe and a pressure sensor to detect the back pressure of said outlet pipe comprising:

a T-connector having one leg connected to said outlet pipe for receiving said condensate and exhaust gases, said leg being inclined slightly downwardly from horizontal;

one arm directed vertically upwardly and forming a passage for receiving said gases;

one arm directed vertically downwardly for receiving said condensate;

said downwardly directed arm being capped at a bottom end and having an elbow therein connected to an opening through a wall of said arm spaced above said bottom end, said elbow having a tube extending downwardly therefrom with an open end closely adjacent said bottom end, said elbow having a connection on the exterior of said arm to a conduit for drainage of said condensate from said downwardly directed arm;

said downwardly directed arm being removable from said T connector to permit access to the interior of said arm;

a float member positioned within said downwardly directed arm and being capable of floating on said condensate such that if the level of said condensate rises above the level of said elbow, said float will rise in said downwardly directed arm to block the passage from said T connector leg to said upwardly directed arm;

whereby, said pressure sensor will detect the blocked passage as an increase in back pressure.

14. A furnace according to claim 13, wherein said downwardly directed arm comprises a cylindrical pipe, said upwardly directed arm comprises a cylindrical pipe and said float member comprises a cylindrical member sized to slidably move within said cylindrical pipes in response to the level of condensate within said downwardly directed arm to block said outlet conduit when said condensate level reaches an undesirable level.

15. A furnace according to claim 14 including a restraining means positioned above said outlet leg in said upwardly directed arm to prevent said float member from continuing to move upwardly in said upwardly directed arm.

16. A furnace according to claim 15, wherein said restraining means comprises a wire member extending across the diameter of said upwardly directed arm.

17. A furnace according to claim 13, wherein said downwardly directed arm has a threaded connection to said T connector.

* * * * *